ately to openings 10, for a purpose which is
UNITED STATES PATENT OFFICE.

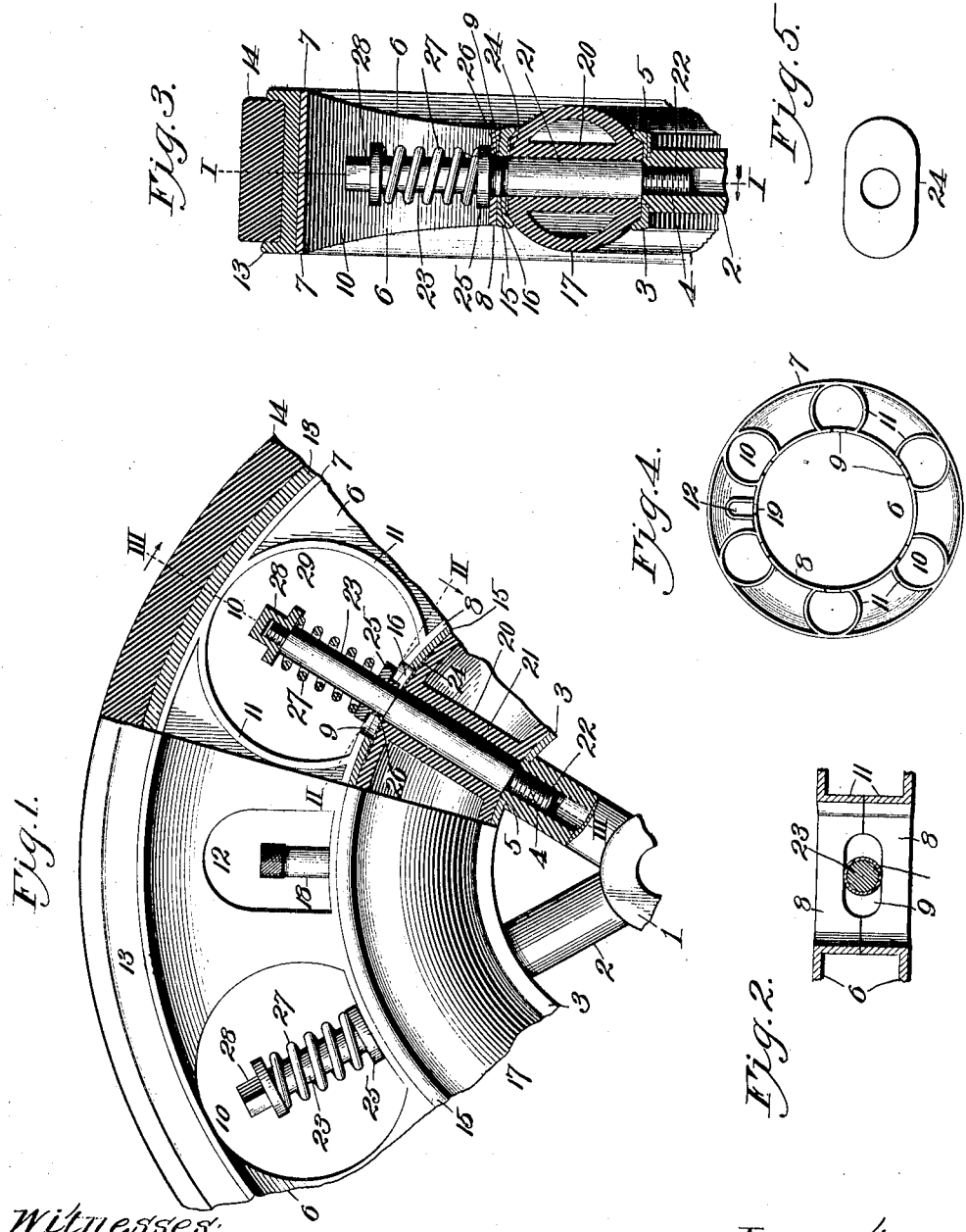

MAX A. HOLZMARK, OF KANSAS CITY, KANSAS.

PNEUMATIC-CUSHION WHEEL.

No. 852,436. Specification of Letters Patent. Patented May 7, 1907.

Application filed January 8, 1906. Serial No. 295,027.

*To all whom it may concern:*

Be it known that I, MAX A. HOLZMARK, a citizen of the United States, residing at Kansas City, in the county of Wyandotte and State of Kansas, have invented certain new and useful Improvements in Pneumatic-Cushion Wheels, of which the following is a specification.

My invention relates to pneumatic cushion wheels, and is designed particularly as an improvement on the pneumatic cushion wheel described and claimed in Patent No. 810,061 issued Jan. 16, 1906, C. A. Lee inventor, and my object is to generally improve the construction embodied in said wheel.

With this object in view the invention consists in certain novel and peculiar features of construction and organization as hereinafter described and claimed; and in order that it may be fully understood reference is to be had to the accompanying drawing, in which,—

Figure 1, is a view partly in side elevation and partly in central section on the line I—I of Fig. 3, of a portion of a wheel embodying my invention. Fig. 2, is a section on the line II—II of Fig. 1. Fig. 3, is a section on the line III—III of Fig. 1. Fig. 4, is an end view of one of the side portions of the outer ring of the wheel. Fig. 5, is a plan view of one of the guard plates hereinafter described.

In the said drawings, the inner member of the wheel comprises the hub 1, the radiating spokes 2, and the grooved rim 3, the spoke passages being internally threaded as at 4, and registering with holes 5 in the grooved rim.

The outer member of the wheel comprises a pair of rings 6, of sheet metal, arranged to diverge outwardly and provided at their outer margins with inwardly projecting flanges 7, and at their inner margins with inwardly projecting flanges 8, the last-named flanges being provided with slots 9 extending circumferentially with respect to the axis of the wheel and communicating with large openings 10, formed in said rings by the oppositely bowed flanges 11 connecting flanges 7 and 8. From the foregoing it will be apparent that the rings 6 arranged as described constitute a hollow sheet metal ring provided with large openings 10 which correspond in number with the spokes and are radially alined therewith, and said ring is provided with slots 9, in the meeting edges of the flanges 8, which open into the large openings. The ring is furthermore provided with a smaller opening 12 corresponding approximately to openings 10, for a purpose which is hereinafter explained.

Secured peripherally to the flanges 7 in any suitable manner is a grooved rim 13, equipped with a solid rubber or equivalent tire 14, and secured to and encircled by the inner flanges 8 of said ring is a grooved rim 15, corresponding to but disposed oppositely from the rim 3 and provided with slots 16 registering with slots 9 of flanges 8. Fitting snugly between said grooved rims 3 and 15 is a circular pneumatic cushion 17 provided with the usual valve plug 18, projecting through rim 15 and slot 19 of flanges 8 into opening 12, and with radial tubular cross pieces 20. 21 indicates spoke-extensions extending through said tubular cross pieces and provided with reduced threaded stems 22 extending through rim 3 and engaging the threaded portions 4 of spokes 2, or said spokes may be otherwise rigidly secured.

23 indicates slightly reduced outer portions of the spoke-extensions, extending through slots 16 and 9 and into openings 10, and fitted upon the spoke-extensions and upon the outer end of portions 21 thereof, are thin metal guards 24 bridging the inner ends of slots 16, to prevent the pneumatic cushion from bulging outward into said slots and thereby suffering abrasion and injury when the wheel is in motion.

25 indicates collars fitting slidingly on the spoke-extensions 23 and having reduced inwardly projecting portions 26 which fit snugly in the slots 9 of flanges 8, these collars being preferably of bronze in order to prevent the sawing or cutting of the spoke-extensions by contact with the walls of the slots, said collars being held in engagement with the slots by the pressure of cushions—preferably in the form of spiral springs 27—surrounding portions 23 and bearing at their outer ends against the cap-nuts 28 screwed or otherwise rigidly secured upon the outer reduced ends of said portions 23.

In practice the relative action of the inner and outer members of this wheel is precisely the same as in that of the wheel described in the patent to which reference has been made. In this wheel, however, undue wear on the cushion is eliminated by the interposition of the guards 24 which are of sufficient length to completely bridge slots 16, irrespective of the position of the spoke-extensions in said slots and the possibility of the spoke-extensions being sawed or cut or otherwise injured by contact with the walls of the slots 9, is eliminated by the employment of the bronze or equivalent collars 25, which project into and also bear against the outer sides of said flanges in order to impose the pressure of the springs 27 thereon. The wheel is furthermore stiffened and strengthened by the employment of the sheet metal rings in lieu of spokes in the construction of the outer member of the wheel.

From the above description it will be apparent that I have produced a pneumatic cushion wheel of simple, strong, durable and practical construction which is susceptible of modification in minor particulars without departing from the principle of construction involved.

Having thus described the invention what I claim as new and desire to secure by Letters Patent, is:—

1. A wheel, comprising a rigid inner member having a rim and radiating spoke-extensions projecting beyond the same, a rigid outer member having an inner rim provided with slots through which said spoke-extensions project, a circular pneumatic cushion fitting between said rims and provided with radial tubular cross pieces fitting on said spoke-extensions, guards fitting on said spoke-extensions and bridging the inner sides of said slots and bearing peripherally on said circular cushion, and springs mounted on the outer ends of the spoke-extensions and imposing pressure outwardly thereon and inwardly on the inner rim of the outer member.

2. A wheel, comprising a rigid inner member having a rim and radiating spoke-extensions projecting beyond the same, a rigid outer member having an inner rim provided with slots through which said spoke-extensions project, a circular pneumatic cushion fitting between said rims and provided with radial tubular cross pieces fitting on said spoke-extensions, guards fitting on said spoke-extensions and bridging the inner sides of said slots and bearing peripherally on said circular cushion, collars fitting slidingly on the outer portions of the spoke-extensions and projecting into the slot of the inner rim of the outer member, and springs upon the outer ends of the spoke-extensions and exerting an outward pressure thereon and an inward pressure on said collars.

3. A wheel, comprising a rigid inner member having a rim and radiating spoke-extensions projecting beyond the same, a rigid outer member having an inner rim provided with slots through which said spoke-extensions project, a circular pneumatic cushion fitting between said rims and provided with radial tubular cross pieces fitting on said spoke-extensions, guards fitting on said spoke-extensions and bridging the inner ends of said slots and bearing peripherally on said circular cushion, collars fitting slidingly on the outer portions of the spoke-extensions and projecting into the slot of the inner rim of the outer member, enlargements rigid with the outer ends of the spoke-extensions and spiral springs encircling said extensions and bearing at their opposite ends against said enlargements and said collars.

4. A wheel, comprising a rigid inner member having a rim and rigid spoke-extensions projecting beyond the rim, an outer member comprising an inner slotted rim and an outer rim, a tire carried by the latter, a pair of rings having inwardly projecting flanges at their outer margins secured to the outer rim of the outer member and inwardly projecting flanges at their inner margins secured to the inner rim of the outer member and provided with slots registering with the slots of the last-named rim, said rings being also provided with large openings communicating with said slots and receiving the outer ends of the spoke-extensions, collars on the spoke-extensions and bearing on the outer side of said inner flanges and projecting into the slots of the latter, springs encircling the outer ends of the spoke-extensions and pressing outwardly thereon and inwardly on said collars, and a circular pneumatic cushion fitting between the contiguous rims of the inner and outer members and provided with radial cross pieces fitting on the spoke-extensions.

5. A wheel, comprising a rigid inner member having a rim and rigid spoke-extensions projecting beyond the rim, an outer member comprising an inner slotted rim and an outer rim, a tire carried by the latter, a pair of rings having inwardly projecting flanges at their outer margins secured to the outer rim of the outer member and inwardly projecting flanges at their inner margins secured to the inner rim of the outer member and provided with slots registering with the slots of the last-named rim, said rings being also provided with large openings communicating with said slots and receiving the outer ends of the spoke-extensions, collars on the spoke-extensions and bearing on the outer side of said inner flanges and projecting into the slots of the latter, springs encircling the outer ends of the spoke-extensions and pressing outwardly thereon and inwardly on said collars, a circular pneumatic cushion fitting between the contiguous rims of the inner and outer members and provided with radial cross pieces fitting on the spoke-extensions, and sheet-metal guards on the spoke-extensions and interposed between the pneumatic cushion and the inner rim of the outer member and of greater length than the slots of the latter.

6. In a wheel, an outer member, comprising inner and outer rims, the inner rim having slots and the outer rim an encircling tire, and sheet-metal rings connecting said rims and provided with transverse openings and with slots establishing communication between said openings and the slots of said rim.

In testimony whereof I affix my signature, in the presence of two witnesses.

MAX A. HOLZMARK.

Witnesses:
H. C. RODGERS,
G. Y. THORPE.